United States Patent
Lundberg et al.

(10) Patent No.: US 8,639,424 B2
(45) Date of Patent: Jan. 28, 2014

(54) SYSTEM AND METHOD FOR CONTROLLING AN AUTOMATIC ENGINE STOP-START ACCUMULATOR

(75) Inventors: Philip C. Lundberg, Keego Harbor, MI (US); Carlos E Marin, Oxford, MI (US); Casie M. Bockenstette, Clarkston, MI (US); Zhen J. Zhang, Canton, MI (US); Paul G. Otanez, Troy, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/288,666

(22) Filed: Nov. 3, 2011

(65) Prior Publication Data

US 2013/0116898 A1    May 9, 2013

(51) Int. Cl.
 *G06F 7/00*  (2006.01)
 *F16H 3/74*  (2006.01)
 *G06F 17/00*  (2006.01)
 *B60K 17/00*  (2006.01)
 *B60K 17/28*  (2006.01)

(52) U.S. Cl.
 USPC ............. 701/54; 475/254; 701/53; 180/305; 180/53.4

(58) Field of Classification Search
 USPC ............. 701/53, 54; 180/53.4, 305; 475/254
 See application file for complete search history.

(56) References Cited

U.S. PATENT DOCUMENTS

| | | | | |
|---|---|---|---|---|
| 4,955,256 | A * | 9/1990 | Kashihara et al. | 477/152 |
| 4,975,845 | A * | 12/1990 | Mehta | 701/59 |
| 5,193,060 | A * | 3/1993 | Leising et al. | 701/51 |
| 5,251,512 | A * | 10/1993 | Koenig et al. | 477/120 |
| 6,074,320 | A | 6/2000 | Miyata et al. | |
| 6,470,252 | B2 * | 10/2002 | Tashiro et al. | 701/51 |
| 6,647,326 | B2 * | 11/2003 | Nakamori et al. | 701/22 |
| 6,799,109 | B2 * | 9/2004 | Nakamori et al. | 701/54 |
| 7,280,907 | B2 * | 10/2007 | Hawkins et al. | 701/110 |
| 7,440,833 | B2 * | 10/2008 | Chen | 701/51 |
| 7,556,120 | B2 * | 7/2009 | Sah et al. | 180/305 |
| 7,970,505 | B2 * | 6/2011 | Suzuki | 701/22 |
| 2003/0109970 | A1 * | 6/2003 | Nakamori et al. | 701/22 |
| 2008/0020896 | A1 * | 1/2008 | Kamishima | 477/117 |
| 2009/0112431 | A1 * | 4/2009 | Davidsson | 701/69 |
| 2009/0241883 | A1 * | 10/2009 | Nagoshi et al. | 123/179.4 |
| 2009/0299586 | A1 * | 12/2009 | Miller et al. | 701/54 |
| 2010/0282020 | A1 | 11/2010 | Greenwood et al. | |
| 2011/0139285 | A1 | 6/2011 | Lundberg et al. | |
| 2012/0088630 | A1 | 4/2012 | Zhang et al. | |
| 2012/0088631 | A1 | 4/2012 | Zhang et al. | |
| 2012/0088632 | A1 | 4/2012 | Zhang et al. | |

* cited by examiner

*Primary Examiner* — Thomas Black
*Assistant Examiner* — Tyler Paige

(57) ABSTRACT

A system and method for controlling automatic stop-start of a motor vehicle is provided. The system and method is configured to enable an automatic stop-start mode of operation based on vehicle conditions. In addition, the system and method is configured to selectively actuate an accumulator to prime the transmission for a smooth restart.

13 Claims, 2 Drawing Sheets

SYSTEM AND METHOD FOR CONTROLLING AN AUTOMATIC ENGINE STOP-START ACCUMULATOR

FIELD

Figure 1:
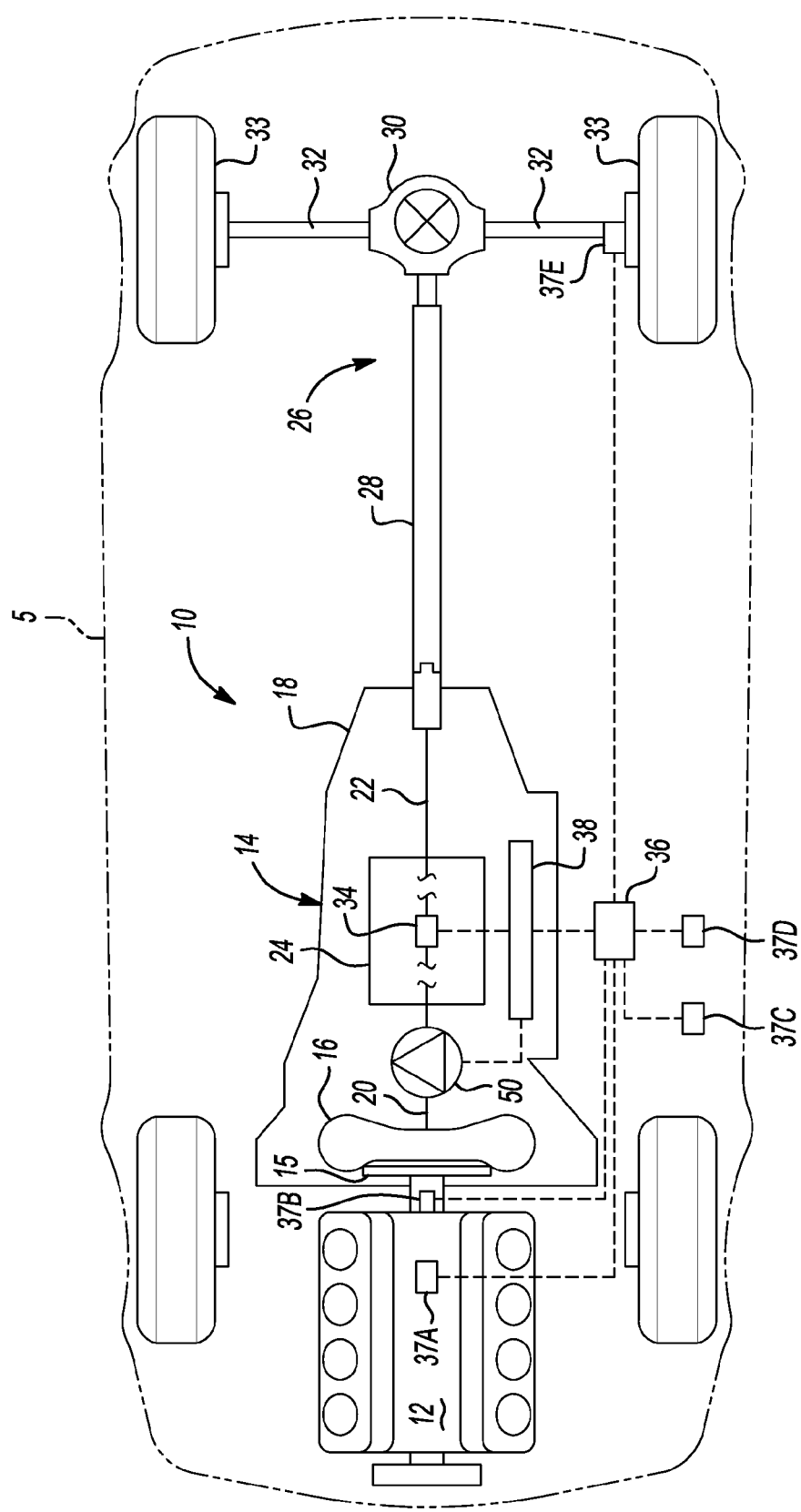

The present disclosure relates to a system and method for controlling an automatic engine stop-start, and more particularly to a system and method for controlling an automatic engine stop-start using measured vehicle conditions and an accumulator.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Additionally, there are conditions where automatically stopping the engine is not desirable, such as during brief stops or idling while still moving.

Therefore, there is a need in the art for a system and method for controlling automatic engine stop-starts based on motor vehicle operating conditions as well as providing controllability of the motor vehicle during engine restart.

SUMMARY

A system and method for controlling automatic stop-start of a motor vehicle is provided. The system and method is configured to enable an automatic stop-start mode of operation based on vehicle conditions. In addition, the system and method is configured to selectively actuate an accumulator to prime the transmission for a smooth restart.

In one example, the system and method uses engine speed, vehicle speed, transmission temperature, and engine temperature to determine whether an automatic stop should be activated.

In another example, the system and method uses the state of the transmission to determine whether an automatic stop should be inhibited.

In yet another example, the system and method controls the accumulator using engine status indicators.

In yet another example, the system and method controls the accumulator using brake pedal position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
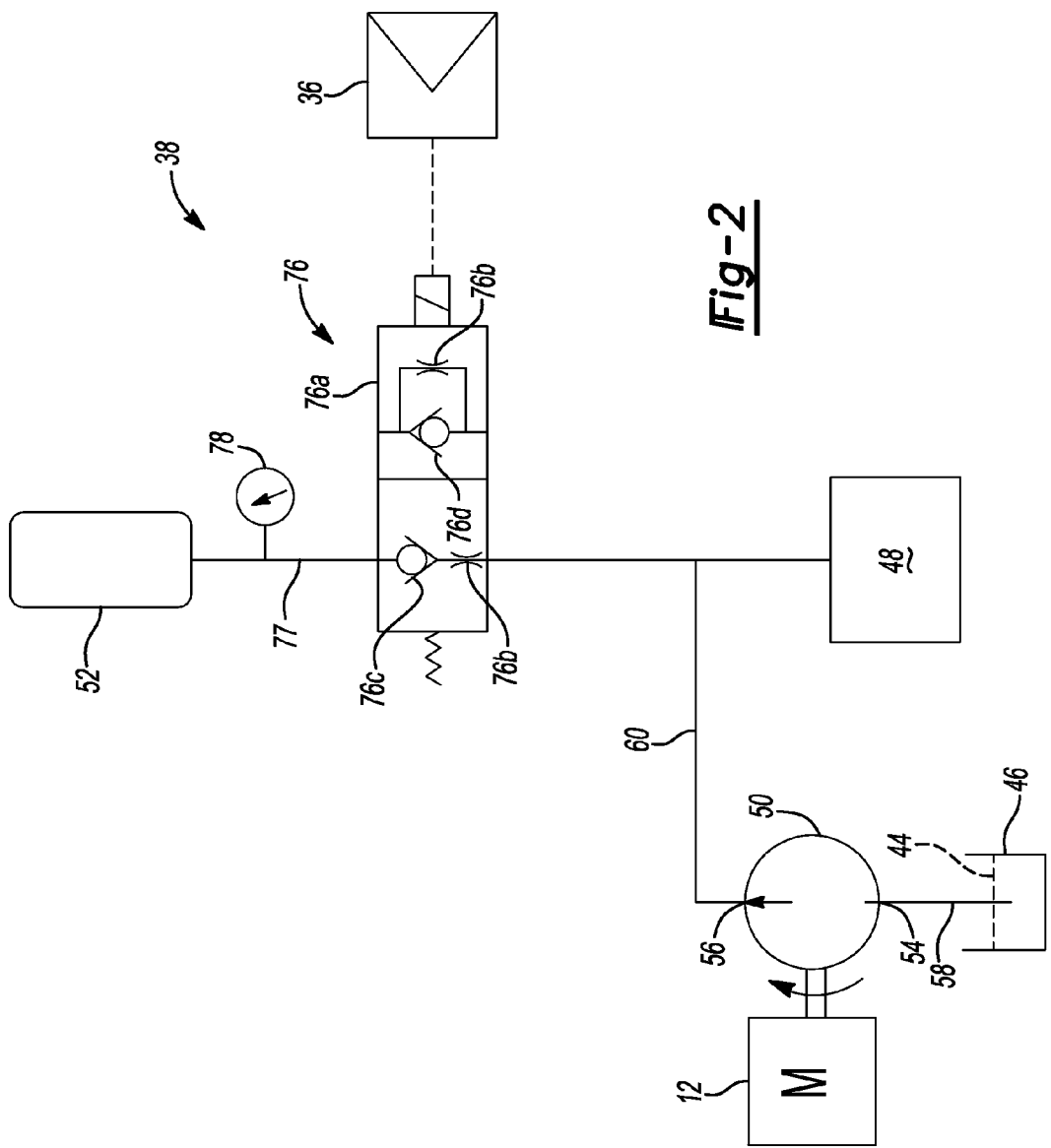

FIG. 1 is a schematic diagram of an exemplary powertrain in a motor vehicle; and FIG. 2 is a schematic diagram of a portion of an exemplary hydraulic control system.

DETAILED DESCRIPTION

The following description is merely exemplary in nature and is not intended to limit the present disclosure, application, or uses.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more an electronic control devices having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44 from a sump 46 to a clutch actuation circuit 48. The clutch actuation circuit 48 includes clutch control solenoids, valves, and actuators operable to engage the plurality of clutches/brakes 34. The hydraulic fluid 44 is communicated to the clutch actuation circuit 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a main line pressure circuit 60. The main line pressure circuit 60 may include various optional features including, for example, a spring biased blow-off safety valve, a pressure side filter, or a spring biased check valve.

The main line pressure circuit 60 communicates with the clutch actuation circuit 48 and a solenoid 76. The solenoid 76 is in fluid communication with an accumulator supply line 77. The solenoid 76 is electrically controlled by the control module 36 and is operable to control the charge state of the accumulator 52. The solenoid 76 is preferably an on/off solenoid having a solenoid valve 76A moveable between a first position and a second position. In the first position, the main line pressure circuit 60 is in fluid communication with a flow restricting orifice 76B that limits the amount of hydraulic fluid 44 that can be bled off the main line pressure circuit 60 in order to prevent the clutch actuation circuit 48 from being starved of hydraulic fluid 44. The flow restricting orifice 76B communicates with a one way check ball or poppet valve 76C. The check ball valve 76C is configured to maintain pressure within the accumulator 52. When the solenoid valve 76A is energized and moved to the second position, the restriction orifice 76B is positioned in parallel with a one way check or poppet valve 76D. The check ball valve 76D prevents fluid backflow into the accumulator 52.

The solenoid 76 communicates with the accumulator 52 and a pressure sensor 78. The accumulator 52 is an energy storage device in which the non-compressible hydraulic fluid 44 is held under pressure by an external source. The accumulator 52 includes a piston that has a seal that slides along a bore of the accumulator housing. On one side of the piston there is hydraulic fluid 44 and on the other side of the piston there is one or more springs and air. The accumulator 52 uses a combination of spring(s) and air to generate the force on one side of the piston that reacts against the hydraulic fluid pressure on the opposite side of the piston. An example of an accumulator for use with the present invention is disclosed in commonly assigned U.S. patent application Ser. No. 12/635,587 filed Dec. 10, 2009, hereby incorporated by reference as if fully disclosed herein. The accumulator 52, when charged, effectively replaces the pump 50 as the source of pressurized hydraulic fluid 44, thereby eliminating the need for the pump 50 to run continuously. The pressure sensor 78 reads the pressure of the hydraulic fluid 44 within the supply line 77 in real time and provides this data to the control module 36. Other types of sensors, such as volume or position sensors, may also be included.

The control of flow in out of the accumulator 52 is performed through two different processes using the same solenoid 76. When the pump 50 is on, hydraulic fluid 44 flows from the main line pressure circuit 60 into the de-energized solenoid 76. Once the hydraulic fluid 44 passes through the orifice 76B, the hydraulic fluid 44 unseats the check valve 76C and flows into the accumulator 52. Therefore, in order to charge the accumulator 52, the pressure in the main line pressure circuit 60 must be higher than the pressure in the accumulator 52 in order to unseat the check valve 76C. The hydraulic fluid 44 pressure acts on the piston, pushing it against the air and spring(s) on the other side. If the force of the air and spring(s) is less than the force generated by hydraulic fluid 44 pressure, then the piston will move allowing more oil to flow into the accumulator 52. If the force generated by air and spring(s) is equal to the force generated by hydraulic fluid 44 pressure, then there will be no movement of the piston. If the force generated by the air and spring(s) is greater than the force generated by hydraulic fluid 44, the piston will move causing the accumulator 52 to exhaust. The accumulator 52 pressure is monitored by the pressure sensor 78 to determine if the accumulator 52 is fully filled. The accumulator 52 can be filled quickly by opening or energizing the solenoid 76, however this places a large flow demand on the main line pressure circuit 60.

Hydraulic fluid 44 is stored in the accumulator 52 at a set volume and pressure while the engine 12 is off. While the solenoid 76 is off, hydraulic fluid 44 will remain in the accumulator 52 as there is no path for any hydraulic fluid 44 to bypass the solenoid 76, excluding the minute amount of leakage that weeps past the clearances in the parts of the solenoid valve 76A. When the solenoid 76 is energized electrically, it opens. The decision to energize the solenoid 76 is determined based on an engine start command in order to have the clutches/brakes 34 ready for vehicle launch. Energizing the solenoid 76 allows hydraulic fluid 44 to leave the accumulator 52, enter the solenoid 76, and flow into the main line pressure circuit 60 that feeds the clutch actuation circuit 48. The clutch actuation circuit 48 controls the pressure and flow rate to the clutches/brakes 34 to control clutch capacity during the engine start up event to eliminate torque bumps and increase the isolation of engine start up vibrations. Once pressure within the main line pressure circuit rises due to the activation of the pump 50, the solenoid 76 is closed electrically by turning off power to the solenoid 76. The accumulator 52 charge process can start over again to allow for another engine off event.

When the motor vehicle 5 stops (i.e., at a red light for example), it may be desirable to shut off the engine 12 in order to improve fuel economy. However, during an automatic engine stop event, the engine 12 is shut down which cause a loss of hydraulic fluid 44 pressure in the transmission hydraulic circuit and clutches. In order to properly control the transmission 14 upon engine re-start and vehicle launch, transmission oil circuits must be filled and clutches pre-staged before vehicle launch by discharging the accumulator 52. For example, when an auto start signal is commanded the controller 36 energizes the solenoid 76 thereby discharging the accumulator 52 for a period of calibrated time. In addition, application of a brake pedal for a predefined period of time may also be used to initiate accumulator 52 discharge. An example of a method for determining when to discharge the accumulator 52 is disclosed in commonly assigned U.S. patent application Ser. No. 13/228,275 filed on Sep. 8, 2011, hereby incorporated by reference as if fully disclosed herein. The solenoid commands in the clutch actuation circuit 48 electrically set up the transmission 14 to engage a minimum number of clutches/brakes so that only the minimum number of clutches/brakes needs to be filled. An example of selecting the minimum number of clutches/brakes is disclosed in commonly assigned U.S. patent application Ser. No. 13/228,664 filed Sep. 9, 2011, hereby incorporated by reference as if fully disclosed herein.

In the following transmission 14 conditions the automatic stop will be prohibited: the pressure in the accumulator 52 is not high enough or the hydraulic fluid 44 temperature is low. When the pressure in the accumulator 52 is not high enough, the pressure in the main line pressure circuit 60 is increased to charge the accumulator 52 at proper conditions. When the hydraulic fluid 44 temperature increases beyond a threshold for allowing automatic stop, the accumulator 52 is discharged to discharge the cold fluid in the accumulator 52 in order to exchange the cold fluid in the accumulator 52 with the warmer fluid before allowing automatic stop. An example of the transmission conditions overriding or inhibiting the automatic stop is described in commonly assigned U.S. patent application Ser. No. 13/228,658 filed on Sep. 9, 2011, hereby incorporated by reference as if fully disclosed herein.

During an automatic stop, if the accumulator 52 pressure is detected as being low (for example due to an accumulator leak), the controller 36 will restart the engine 12 and finish the automatic stop start. After key off and vehicle stop, the accumulator 52 is discharged.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling a powertrain in a motor vehicle, the powertrain having an engine and a transmission with a solenoid in fluid communication with an accumulator, the method comprising:
    determining a first set of vehicle status indicators;
    determining a set of transmission status indicators;
    shutting off the engine of the motor vehicle as a function of the first set of vehicle status indicators;
    inhibiting shutting off the engine of the motor vehicle as a function of the set of transmission status indicators;
    determining a second set of vehicle status indicators; and
    opening the solenoid to discharge the accumulator as a function of the second set of vehicle status indicators.

2. The method of claim 1 wherein determining the first set of vehicle status indicators includes sensing a wheel speed of the motor vehicle and determining whether an ignition of the motor vehicle is in an on position.

3. The method of claim 2 wherein shutting off the engine of the motor vehicle as a function of the first set of vehicle status indicators includes shutting off the engine of the motor vehicle if the sensed wheel speed of the motor vehicle is approximately zero and the motor vehicle ignition is in the on position.

4. The method of claim 1 wherein determining the second set of vehicle status indicators includes determining if the engine has been commanded to restart and sensing whether a brake pedal of the motor vehicle is depressed.

5. The method of claim 4 wherein opening the solenoid to discharge the accumulator as a function of the second set of vehicle status indicators includes opening the solenoid to discharge the accumulator if the engine has been commanded to restart or the brake pedal of the motor vehicle has been depressed for a period of time exceeding a brake pedal time threshold.

6. The method of claim 5 wherein opening the solenoid to discharge the accumulator as a function of the second set of vehicle status indicators includes discharging the accumulator if the brake pedal has been released.

7. The method of claim 1 wherein determining the set of transmission status indicators includes:
    sensing an engine output speed;
    sensing an engine temperature; and
    sensing a transmission temperature.

8. The method of claim 7 wherein inhibiting shutting off the engine of the motor vehicle as a function of the set of transmission status indicators includes inhibiting the engine from shutting off if the sensed engine output speed exceeds an engine output speed threshold, the sensed engine temperature is below a first engine temperature threshold, the sensed engine temperature is above a second engine temperature threshold, the sensed transmission temperature is below a first transmission temperature threshold, or the sensed transmission temperature is above a second transmission temperature threshold.

9. The method of claim 1 further comprising determining a pressure of hydraulic fluid in the accumulator and inhibiting the engine from shutting off if the pressure of the hydraulic fluid in the accumulator is below a fill threshold.

10. The method of claim 9 further comprising sensing a speed of the engine and filling the accumulator if the pressure of hydraulic fluid in the accumulator is below the fill threshold and if the speed of the engine is greater than an engine speed charging threshold for a first predefined period of time.

11. The method of claim 10 wherein filling the accumulator includes moving the solenoid to one of a closed position and an open position, wherein the accumulator fills at a slower rate in the closed position than in the open position.

12. A method for controlling a powertrain in a motor vehicle, the powertrain having an engine and a transmission with a solenoid in fluid communication with an accumulator and having a plurality of torque transmitting devices operable to provide at least a plurality of gear speeds, the method comprising:
   determining a first set of vehicle status indicators;
   determining a set of transmission status indicators including a sensed pressure in the accumulator and a temperature of a hydraulic fluid in the transmission;
   shutting off the engine of the motor vehicle as a function of the first set of vehicle status indicators;
   inhibiting shutting off the engine of the motor vehicle as a function of the set of transmission status indicators;
   determining a second set of vehicle status indicators;
   opening the solenoid to discharge the accumulator as a function of the second set of vehicle status indicators;
   commanding the transmission to provide a gear speed of the plurality of gear speeds;
   engaging a first set of the plurality of torque transmitting devices required to provide the commanded gear speed;
   starting the engine;
   setting an engine timer to a zero value;
   incrementing the engine timer;
   calculating a time threshold based on a requested power demand to the powertrain;
   engaging a second set of the plurality of torque transmitting devices required to provide the commanded gear speed if the engine timer is greater than the time threshold; and
   engaging a third set of the plurality of torque transmitting devices required to provide the commanded gear speed if a second, higher gear speed than the commanded gear speed has been subsequently commanded.

13. The method of claim 12 wherein the number of torque transmitting devices in the first set is less than the number of torque transmitting devices in the second set or the third set.

* * * * *